Patented Mar. 18, 1947

2,417,455

UNITED STATES PATENT OFFICE 2,417,455

TERPENE ETHERS

Richard F. B. Cox, Wilmington, Del., assignor to Hercules Powder Company, Wilmington, Del., a corporation of Delaware No Drawing. Application October 4, 1943,
Serial No. 504,927

4 Claims. (Cl. 260—611)

This invention relates to new terpene compounds and a method for their formation. More particularly, it refers to new ethers of terpenes and nitro-substituted monohydroxy alcohols and to a method for their preparation.

By the method in accordance with this invention, a terpene compound is brought into intimate contact with a nitro-containing monohydric alcohol and is reacted therewith until a nitro-containing terpene ether is formed.

More particularly, by the method of this invention, a terpene compound as, for example, camphene or pinene is brought into intimate contact with a nitro-containing monohydric primary alcohol and heated in the presence of a suitable catalyst as, for example, phosphoric acid until a nitro-containing terpene ether is formed.

The method in accordance with this invention is illustrated by the following specific examples. All parts and percentages are by weight unless otherwise indicated.

EXAMPLE 1

2-methyl-2-nitropropyl isobornyl ether

A mixture of 360 g. of camphene, 275 g. of nitroisobutyl alcohol, and 100 g. of 85% phosphoric acid were heated at a temperature between 30-40° C. for one hour with vigorous stirring. After standing for 16 hours at room temperature, the mixture was re-heated to a temperature of between about 30-40° C. for 25 hours whereupon two layers of liquid were formed, the upper layer containing the product. About 200 ml. of benzene were added to the mixture which was then washed several times with water followed by two washings with dilute sodium hydroxide solution. A few sodium hydroxide pellets were added to the water-washed mixture and the solution then steam distilled for 3½ hours to remove the benzene and unreacted camphene. The oily product was dissolved in 500 cc. of petroleum ether and water washed several times to remove any sodium hydroxide present. After removal of the petroleum ether by heating under reduced pressure, 381 g. of 2-methyl-2-nitropropyl camphene ether were obtained. Analysis showed 5.5% nitrogen.

EXAMPLE 2 p-Nitrobenzyl isobornyl ether

Twenty-five grams of p-nitrobenzyl alcohol and 35 g. of camphene were dissolved in 100 ml. of benzene, 10 g. of 85% phosphoric acid were added and the resulting mixture stirred for 25 hours at 50-60° C. The reaction mixture was poured into water, and the benzene layer was washed free of acid. This layer was steam distilled to remove unreacted camphene and the benzene solvent. Forty-one grams of light orange liquid was obtained. Analysis showed 4.92% nitrogen, a refractive index of 1.5377 and a density of 1.1044 20°/4.

EXAMPLE 3

2-nitroisoamyl isobornyl ether

A mixture of 200 g. camphene, 150 g. of nitroisoamyl alcohol and 50 g. of 85% phosphoric acid was stirred at 30-40° C. for 24 hours and was then poured into water and extracted with 100 ml. benzene. The benzene extract was washed free of phosphoric acid with 5% sodium bicarbonate solution. After removal of the benzene under reduced pressure, there remained 270 g. oily isobornyl ether of 2-nitroisoamyl alcohol.

Each of the following examples was carried out in the manner set forth in Example 1:

| Ex. | Terpene, parts | Nitro compound | Parts | Catalyst | Parts | Reaction conditions | | Nitro containing terpene ether, parts |
|---|---|---|---|---|---|---|---|---|
| | | | | | | Time | Temp. | |
| | | | | | | Hours | ° C. | |
| 4 | Allo-ocimene 136 | Nitroethanol | 100 | 85% H₃PO₄ | 80 | 48 | 30 | 130 |
| 5 | Pinene 180 | 2-methyl-2-nitro propyl alcohol | 140 | 85% H₃PO₄ | 60 | 42 | 3-40 | 193 |

In accordance with this invention, a nitro-containing terpene ether may be formed from a terpene and a nitro-containing monohydric alcohol. Nitro-containing compounds suitable for the preparation of these ethers are nitrosubstituted monohydric alcohols. These alcohols may be aliphatic or aromatic. Primary monohydric nitrosubstituted alcohols are preferred. Suitable monohydric alcohols for forming nitro-containing terpene ethers are, for example, 2-methyl-2-nitropropyl alcohol, nitroethanol, nitropropanol, nitroamyl alcohol, nitroisoamyl alcohol, nitrolauryl alcohol, p-nitrobenzyl alcohol, o-nitrobenzyl alcohol, etc. Each of these alcohols may be used under conditions like or similar to those given in the examples.

The terpenes utilized in the method according to this invention will be an unsaturated terpene which may be of a substituted or unsubstituted nature. Thus, the term "terpene" as used herein and in the claims is used in its broader sense and includes both terpene hydrocarbons and derivatives thereof which may be considered as terpene hydrocarbons which have been modified by substitution or addition thereto of elements or groups containing elements such as oxygen, sulfur, nitrogen, halogen, etc. Suitable unsaturated terpenes which may be utilized are such unsaturated terpene hydrocarbons as, for example, alpha-pinene, beta-pinene, sylvestrene, alpha-terpineol, beta-terpineol, terpinenol, or unsaturated complex cyclic terpenes capable of isomerization to unsaturated monocyclic terpene compounds such as alpha-pinene, beta-pinene, sabinene, carene; or cyclic terpenes, which are not readily isomerized to monocyclic terpenes such as fenchene, camphene, and bornylene, may be employed. The terpene compounds need not be in the form of pure compounds for the purpose of the preparation of the ether, but may be used in the form of crude natural mixtures of terpene compounds as, for example, turpentine, pine oil, etc. Each of the terpenes listed will react under conditions like or similar to those given in the examples.

With some of the terpenes a mixture of products is obtained. For example, with camphene as a starting material, the chief product is an isobornyl ether but a small amount of bornyl ether may also be obtained; with pinene as a starting material, the main product is a terpinyl ether but a small amount of other terpene ethers, such as ethers of borneol, isoborneol, terpinene-4-ol and beta-terpineol, is also obtained.

The reaction is brought about by mixing the terpenes and the nitro-containing compounds preferably in alcohol in the presence of a suitable catalyst as, for example, acid catalysts such as phosphoric acid in 85% concentration, 25–50% sulfuric acid, p-toluenesulfonic acid, hydrofluoric acid, and boron halides, such as boron trifluoride and boron trifluoride-ether complex.

The reaction may be conducted at any temperature in the range between about 0° C. to about 130° C. and preferably between about 40° C. and about 50° C. Under exothermic reaction conditions, it is desirable to provide external cooling means for maintaining the reaction conditions at the desired temperature. The specific reaction temperature will be dependent upon the catalyst used. For example, temperatures from 80° C.–130° C. are suitable when paratoluenesulfonic acid is used. When hydrofluoric acid or boron trifluoride is used as the catalyst, temperatures of 0° C.–30° C. are most suitable while a temperature range of about 30° C. to about 80° C. is preferred when the catalyst is phosphoric acid or dilute sulfuric acid.

The time required to form nitro-containing terpene ethers by the method in accordance with this invention varies considerably with the conditions of reaction and with the reactions utilized. Fenchene and camphene react much more readily than other terpenes. The conditions of heating and the type of catalyst used determine the minimum time of reaction for a particular set of reactants. Generally, the reaction time may be from 19 hours to about 20 days. Continuous operation is practicable under conditions giving short reaction time; batch operation is preferred for the longer reaction.

Usually, the liquid reaction mixture will consist essentially of the terpenes and the nitro-containing alcohol reactant, with the alcohol in excess of that expected to enter into the reaction. However, inert diluents such as benzene, toluene, chloroform, petroleum ether, and the like, may be added.

The etherification reaction in accordance with this invention produces a nitro-containing terpene ether of the following general formula: $NO_2$—R—O—T, where R represents a bivalent hydrocarbon radical from a monohydric alcohol, preferably from an aliphatic or aromatic primary monohydric alcohol, and T represents a terpene radical. The rate of etherification may be controlled by adjusting the conditions of reaction as, for example, time, temperature, proportion of reactant and/or catalyst. The reaction may be conducted in the substantial absence of or in the presence of a small amount of water. Large quantities of water tend to slow down the reaction due to the increased immiscibility with the terpene. Hence, where water is utilized, the quantity will preferably be in the range between a minor quantity such as 5% of the nitrohydric compound up to about ½ the quantity of the nitrohydric compound by molecular proportion.

The nitro-containing terpene ethers made in accordance with this invention are useful either alone as an insecticide, or when admixed with certain other plant-body insecticidal materials as for example, pyrethrum, rotenone, etc., are observed to have a greater toxic effect on insects than either component of the admixture used alone. Thus, it has been found that when 5% of the nitro-containing terpene ether is admixed in a suitable carrier as, for example, deodorized kerosene, with 2.5% pyrethrum, (20:1 concentration) the results of toxicity show an increase over the toxicity of either one of the components when used alone under like conditions.

From the foregoing description, it is apparent that a new product and method of production has been provided. More specifically, a nitro-containing terpene ether of a monohydric organic compound has been provided having insecticidal activating properties.

This application is a continuation-in-part of my application, for United States Letters Patent, Serial No. 452,499, filed July 27, 1942.

What I claim and desire to protect by Letters Patent is:

1. An ether of a terpene and a nitro-substituted monohydric alcohol selected from the group consisting of nitroethanol, 2-methyl-2-nitropropyl alcohol, and nitroisoamyl alcohol.

2. An ether of 2-methyl-2-nitropropyl alcohol and a terpene.

3. An ether of 2-methyl-2-nitropropyl alcohol and camphene.

4. 2-methyl-2-nitropropyl isobornyl ether.

RICHARD F. B. COX.

REFERENCES CITED

The following references are of record in the file of this patent:

UNITED STATES PATENTS

| Number | Name | Date |
| --- | --- | --- |
| 2,151,769 | Humphrey | Mar. 28, 1939 |

OTHER REFERENCES

Chem. Abstracts, vol. 27, p. 1877 (1933)